United States Patent [19]

Gantt et al.

[11] Patent Number: 5,753,029
[45] Date of Patent: May 19, 1998

[54] METHOD FOR BLEACHING KAOLIN CLAY

[75] Inventors: George E. Gantt, Milledgeville; Gerald Smith, Dublin, both of Ga.

[73] Assignee: Engelhard Corporation, Iselin, N.J.

[21] Appl. No.: 763,569

[22] Filed: Dec. 10, 1996

[51] Int. Cl.$^6$ ................................................ C04B 14/04
[52] U.S. Cl. ............... 106/488; 106/487; 252/187.26; 252/188.1; 252/186.1; 252/186.21
[58] Field of Search ........................ 106/486, 488, 106/487; 501/146; 252/186.1, 187.26, 188.1, 188.22, 186.21

[56] References Cited

U.S. PATENT DOCUMENTS

| | | | |
|---|---|---|---|
| 3,130,063 | 4/1964 | Millman et al. | 106/308 |
| 3,353,668 | 11/1967 | Duke | 209/10 |
| 3,371,988 | 3/1968 | Maynard et al. | 23/110 |
| 3,471,011 | 10/1969 | Iannicelli et al. | 209/214 |
| 3,616,900 | 11/1971 | Cecil | 209/1 |
| 3,635,744 | 1/1972 | Malden | 106/288 B |
| 3,655,038 | 4/1972 | Mercade | 209/5 |
| 3,661,515 | 5/1972 | Iannicelli et al. | 23/110 R |
| 3,674,558 | 7/1972 | Malden | 134/2 |
| 3,861,934 | 1/1975 | Mallary et al. | 106/288 B |
| 4,781,298 | 11/1988 | Hemstock et al. | 209/3 |
| 4,935,391 | 6/1990 | Caropreso et al. | 501/146 |
| 5,112,782 | 5/1992 | Brown et al. | 501/144 |
| 5,342,443 | 8/1994 | Forbus et al. | 106/488 |
| 5,397,754 | 3/1995 | Iannicelli et al. | 106/486 |

*Primary Examiner*—Michael Marcheschi
*Attorney, Agent, or Firm*—Inez L. Moselle

[57] ABSTRACT

An improved method for improving the brightness of clay of the type that is capable of being bleached by an oxidative reagent, such as Georgia gray kaolin. Such clay, in the form of a dispersed slurry, is treated with a combination of an inorganic condensed phosphate, sodium hypochlorite and ozone, preferably including separate treatment steps of magnetic purification and reductive bleaching. Suitable phosphates include sodium hexametaphosphate, sodium tripolyphosphate and tetrasodium pyrophosphate. The hypochlorite is added shortly before ozonation, and the phosphate is added before, simultaneously with, or after the hypochlorite.

15 Claims, No Drawings

1

METHOD FOR BLEACHING KAOLIN CLAY

BACKGROUND OF THE INVENTION

1. Field of the Invention

This invention relates to an improved method for increasing the brightness of clay of the type that is capable of being bleached by an oxidative reagent. More specifically, the invention relates to bleaching such clay in the form of a dispersed slurry with a combination of an inorganic condensed phosphate salt, such as sodium hexametaphosphate, with sodium hypochlorite and ozone as oxidant bleaches, followed by magnetic purification and, optionally and preferably, a reduction bleach.

2. Description of Related Art

Small increases in the brightness of kaolin products (e.g., brightness increases of as little as ½% on the GE scale) may have an appreciable effect on the value of the product to the consumer. The costs associated with bleaching represent a substantial expense to operators of kaolin plants. The chemical cost of bleaching chemicals in a single large kaolin plant can exceed several million dollars per year. Reduction of bleach consumption is obviously of significant commercial value. Improved design of ozone generators would be a potential for achieving either enhanced utilization or higher brightness of bleached clay products when ozone is employed as a bleaching agent. However, capital costs may rule out this approach. Chemical means for increasing the effectiveness of bleaching chemicals in a kaolin plant must take into account the necessity for maintaining the kaolin in the form of a dispersed slurry of adequate concentration that remains fluid during certain processing steps and not introducing material that will adversely affect the rheology (i.e., viscosity) of the finished clay product. Corrosive chemicals or chemicals that leave potentially noxious residues in products or by-product streams must be avoided.

For over a half century the kaolin clay industry has been following the practice of bleaching kaolin clays with reducing bleaches such as hydrosulfite (dithionite) salts to provide clay products of increased brightness and value to the consumer. The bleached clays, in particular fine particle fractions of bleached clays, are most widely used by the paper industry for coating paper and paper board.

Not all kaolins, however, respond adequately to reduction bleaches. Certain unique deposits of kaolin clay have the potential to be the source of premium high glossing grades of coating clay or as blending clays by virtue of the ultrafine particle size of the kaolin. These clays are the type known in the art as "hard" kaolins or "gray" kaolins because of the distinctive gray color. They contain small amounts of carbonaceous impurities and have a high iron content. Generally, such kaolins do not respond satisfactorily, if at all, to the action of reducing bleaches absent pretreatment. Consequently, for many years vast reserves of potentially premium grades of kaolin were of limited use. Widespread utilization of these potentially premium grades of clays awaited the landmark discovery that the addition of an oxidant to an aqueous slurry of such clay prior to use of a conventional reducing bleach resulted in a significant improvement in brightness of this type of clay. This discovery is set forth in U.S. Pat. No. 3,353,668, Duke, assigned to a predecessor of the assignee of the subject patent application. The oxidants disclosed in the '668 patent are broadly defined as compounds containing molecularly available oxygen. Disclosed subgenus and species included potassium permanganate (preferred), oxygen gas, alkali bichromates, alkali chlorates, alkali chlorites, ammonium persulfate and soluble peroxides such as sodium and hydrogen peroxide. The patent broadly teaches that a combination of oxidizing agents can be used. The preferred treatment involves incorporating the oxidant into a slurry of clay to be bleached without addition of alkaline clay dispersants. Consistent with the preference for employing a nondispersed slurry is the expressed preference in the patent for a pH in the range of 2.5 to 5.0. At these low pH values, kaolins are normally flocculated, not dispersed.

Another seminal development in the bleaching of gray kaolins resulted from the subsequent discovery that ozone gas was an effective oxidative bleach for aqueous slurries of gray kaolin. This discovery was of considerable commercial importance because slurries of gray clay could now be effectively bleached on a commercial scale without requiring the oxidation-reduction sequence and without leaving noxious by-products originating in the preferred permanganate oxidant. Another advantage was that ozone did not adversely affect the rheology (viscosity) of the bleached clay product. See U.S. Pat. No. 3,616,900, Cecil, et al. (1971), also commonly assigned with the subject application. The ozone bleach was preferably followed by a reduction bleach. Ozone treatment was said to be effective at pH values in the range of 2 to 11, preferably 7 to 9.

This invention was followed by a considerable effort by the kaolin industry to utilize ozone in various manners to bleach gray kaolins.

In U.S. Pat. No. 3,861,934, Mallary, et al., commonly assigned, the concept of preoxidizing kaolins before applying a reduction bleach was expanded to brightening kaolins contaminated with residues of flotation reagents. Species of oxidants are disclosed at col. 7, the paragraph beginning at line 40. Sodium hypochlorite and ozone are included in the listing of oxidants.

Use of ozone to bleach floated and unfloated grades of kaolin is also disclosed in U.S. Pat. No. 3,635,744, Malden. In U.S. Pat. No. 3,674,558, Malden, bleaching of clay with ozone is carried out while the clay is dry or substantially dry. U.S. Pat. No. 3,655,038, Mercade, commonly assigned with the subject application, is directed to an improvement in a process for increasing the brightness of kaolin clay by subjecting pulp of the clay to an oxidation treatment with ozone followed by froth flotation to remove colored impurities. The treatment, which utilizes a reagent to decrease the solubility of calcium ions, takes place after ozonation. Reagents are soluble oxides, hydroxides and carbonates. In col. 3, it is disclosed that ozone treatment results in a decrease in pH of the pulp which may be 9 before ozonation.

U.S. Pat. No. 4,935,391 (Caropreso, et al.) teaches the use of hydrogen peroxide prior to or simultaneously with ozone, using a kaolin slurry having a pH adjusted to a value in the range of 5 to 9.

The use of sodium hypochlorite as an oxidative bleach, such as proposed in U.S. Pat. No. 3,353,356 (supra), eventually became widespread in the kaolin industry. In this case, the oxidizing agent, sodium hypochlorite, was added to a clay slurry from the mine instead of adding the oxidant to previously refined kaolin. The reason for using sodium hypochlorite at this upstream portion of the kaolin processing is that long times are required for sodium hypochlorite to bleach clays. Addition of sodium hypochlorite at or near the mine site prior to transport of a kaolin slurry to a plant provided the required residence time for this bleach to react with and bleach the clay. Also, the long residence time minimized the amount of potentially undesirable hypochlorite present in downstream processing. U.S. Pat. No. 3,661, 515 (Iannicelli, et al.) relates to a method for brightening kaolin clays by oxidation of the organics and simultaneous settling of contaminants and coarse clay particles. Sodium hypochlorite is among the oxidants disclosed. Prolonged contact between oxidant and the kaolin slurry was required. Numerous other patents disclose the use of sodium hypochlorite in bleaching clays.

The use of various phosphates as dispersants or deflocculating agents is well known. Of particular use are the condensed phosphates, which are phosphorus compounds with two or more phosphorus atoms in the molecule, including polyphosphates and pyrophosphates. U.S. Pat. No. 3,130,063 (Millman, et al.) discusses the use of various phosphate deflocculating agents, including both condensed phosphates and monophosphorus compounds, including trisodium phosphate, tetrasodium phosphate, tetrasodium pyrophosphate, sodium hexametaphosphate, sodium acid pyrophosphate, tetrasodium phosphate and sodium tripolyphosphate. U.S. Pat. Nos. 3,371,988 (Maynard, et al.) and 3,471,011 (Iannicelli, et al.), as well as Iannicelli +515 (supra), also discuss the use of phosphates, particularly sodium hexametaphosphate ("CALGON®") as a dispersing or deflocculating agent for clay slurries.

U.S. Pat. No. 5,342,443, Forbus et al. (Forbus), commonly assigned and incorporated herein by reference, discloses an improved method for increasing the brightness of clay of the type that is capable of being bleached by an oxidative reagent. More specifically, the patent relates to bleaching clay in the form of a dispersed slurry with a combination of sodium silicate as a dispersant and sodium hypochlorite and ozone as oxidant bleaches. In contrast to the bleach technique of U.S. Pat. No. 3,353,668 (supra), the process of Forbus requires the use of a dispersed clay slurry. Other distinctions of the Forbus process are that an excess of dispersant is used, beyond what is necessary to fully disperse the clay, and both of the oxidants are added essentially simultaneously. An important advantage of the Forbus process over the bleach process of U.S. Pat. No. 4,935,391 (supra) is that it does not use hydrogen peroxide or a chemical that generates hydrogen peroxide. Hydrogen peroxide is a corrosive chemical which can corrode metal in processing equipment, which would be a serious contamination problem in a plant producing bleached clay. In contrast to the prior commercial practice of using sodium hypochlorite as a bleach in kaolin operations with prolonged contact, the Forbus process employs only small amounts of such material and it has only a short residence before the primary oxidant, ozone, is introduced. Minimal amounts (if any) of hypochlorite are present in the product or by-process streams.

Despite the excellent results achieved with the combination of sodium silicate and sodium hypochlorite in the process of the Forbus patent, there are also certain limitations on the process. For example, sodium silicate generally requires neutral to basic pH conditions for dispersion, and is not suitable for use under acidic conditions. To operate with various kaolins and kaolin processes there is a continuing need for alternative processes for obtaining high brightness.

SUMMARY OF THE INVENTION

The present invention is a simple and effective method for enhancing ozone utilization in a kaolin plant. In accordance with the invention, small amounts of an inorganic condensed phosphate salt dispersant and sodium hypochlorite are incorporated into a fluid slurry of gray kaolin clay before ozone is bubbled into the slurry to bleach the clay. Such slurries may have been previously dispersed with phosphates or other inorganic or organic dispersants. However, because ozone generally reacts with organic dispersants, it is important to use an inorganic dispersant, such as the present phosphate salts, to disperse slurries prior to ozonation. The amount of phosphate added is generally about 0.25 to about 5 pounds of inorganic condensed phosphate per ton of clay processed. The amount of sodium hypochlorite added is generally about 0.25 to about 10 pounds of sodium hypochlorite per ton of clay processed. Suitable condensed phosphate salts include inorganic polyphosphates and pyrophosphates (which are actually a type of polyphosphate), such as sodium hexametaphosphate (SHMP), sodium tripolyphosphate (STPP) and tetrasodium pyrophosphate (TSPP).

In the process of the present invention, the fluid slurry is also processed through a magnetic separator, such as a high gradient magnetic separator (HGMS), to magnetically remove colored discrete paramagnetic impurities (principally iron-bearing titania), thus improving brightness. These separators are also known as HIMS units (high intensity magnetic separators). Conventional operation of HGMS units is described in U.S. Pat. No. 4,781,298, Hemstock, et al, which also describes an improved method for operating such units. Conventional or improved HGMS separators can be employed for the magnetic separation step. Cryogenic separators, which are also well known in the art, can be used in place of or in addition to magnetic separation. The slurries fed to such separators must be properly dispersed in order to achieve good separation, and thus to achieve the desired increased brightness of the product.

When magnetic or cryogenic separation is carried out prior to ozonation, then the slurry feed is generally already is dispersed form from previous processing operations. Additional dispersant may be needed prior to separation, and the phosphate dispersants of the present invention are suitable for such purposes. However, as discussed above, organic dispersants are generally destroyed or rendered inactive by the ozonation process. Therefore, if the magnetic or cryogenic separation is carried out after the ozonation process, then it is particularly important to use an inorganic dispersant in the ozonation process so that the slurry stream remains dispersed when it is fed to the magnetic or cryogenic separator. Thus, the use of phosphate dispersant is particularly beneficial when a separation process which requires a dispersed slurry feed is downstream of the ozonation. The phosphate salt thus acts as a dispersant for both the ozonation and separation processes.

The sodium hypochlorite is added substantially immediately before ozone is added to minimize loss of activity of the hypochlorite which can occur when it reacts with components of the clay feed stream. That is, the hypochlorite is generally added within one hour, and preferably within one minute of the injection of ozone in the ozonation process. More preferably the hypochlorite is injected into the feed stream by an in-line mixer just prior to entering the ozonator, for example within about five seconds of ozonation, provided that there is sufficient time and agitation for the hypochlorite to be fully mixed into the slurry. In a further embodiment, the phosphate salt dispersant can be injected simultaneously with the hypochlorite into the feed stream using the in-line mixer.

The phosphate salt dispersant is added before, simultaneously with, or subsequent to, addition of the sodium hypochlorite. Depending upon the specific nature of the kaolin, as well as the relative proportions of sodium hypochlorite and ozone, ozone consumption is reduced or the bleached clay is brighter than it would be in the absence of the hypochlorite pretreatment. The clay is also purified in a magnetic separator, either before or after the hypochlorite/ozone treatment of the invention. Optionally, but preferably, the ozone treated clay is further bleached with a reducing bleach.

The process of the present invention is similar to that of the Forbus 5,342,443 patent, discussed above, except that the inorganic condensed phosphate is used as the dispersant in the ozonation process rather than the sodium silicate of Forbus. This is a significant difference, because under certain operating conditions or with particular clays, the phosphates may be more suitable for use than sodium silicate. As is well known, sodium silicate will break down at acidic pH, with polymerization or precipitation of the silica. Therefore, sodium silicate requires neutral to basic pH conditions to act as a dispersant, and is not suitable for use under acidic conditions. Phosphates, on the other hand, can operate under relatively acidic pH conditions, down to about 5 or even lower, as well as neutral or basic pH. The gray kaolins which are treated in accordance with the present invention often must also undergo a reductive bleaching process, which is carried out under acidic conditions. Furthermore, the addition of sodium silicate will increase the pH of the slurry feed, typically about 8.5 to 9.2, by an amount in the range of about 0.1 to 0.5 pH units. The addition of a phosphate such as SHMP can decrease the pH of the slurry, and still maintain the clay dispersion even at acidic pH. For some clays, and some processes, such as reductive bleaching of gray kaolin clays, it may be essential for the dispersant to work under acidic conditions under which sodium silicate would not be suitable, but the phosphates of the present invention would be.

DESCRIPTION OF THE PREFERRED EMBODIMENT

Clays amenable to the process of this invention are the carbon contaminated gray kaolins of the type mined in Georgia. Generally, these kaolins have a high iron content. These clays are well known in the industry. The description of these kaolins which appears in U.S. Pat. No. 3,353,668 (supra) is incorporated herein by cross-reference.

Typical wet processing of gray kaolins includes blunging, degritting, particle size classification, magnetic purification, ozone bleaching and, in some cases a reduction bleach. In all of these steps water is present with the kaolin; hence, the term wet processing. In many of the processing steps, e.g., fractionation, magnetic purification and ozone treatment, the kaolin water system is in fully dispersed fluid condition. Dispersion (deflocculation) is achieved by incorporating an appropriate dispersant or dispersant mixtures, typically soda ash, sodium silicate, sodium hydroxide or polyacrylate salt, as well as phosphate dispersants, such as the condensed phosphates, as discussed above. The dispersant is required in order to achieve fluidity of the clay-water system at a commercially feasible clay solids content. For example, a 60% solids kaolin-water system may be a solid or semi-solid system when no dispersant is present. When sufficient dispersant is added, the mass is converted to a slurry that may have substantially Newtonian flow.

The clay solids content of dispersed slurries in various wet processing steps may be in the range of about 10 to 70%, usually 30 to 35%. Control of dispersion is essential for the effective operation of the fractionation, ozone bleaching and magnetic purification steps. The pH during wet processing operations is typically from neutral to mildly alkaline. However, for certain clays and processing operations, the conditions may be neutral to mildly acidic. One operation, reduction bleaching, is typically carried out with acidic flocculated clay-water systems. The resulting filter cakes may then be dispersed, spray dried or formed into dispersed high solids slurries for shipment.

The process of this invention is versatile and may utilize a dispersed fluid clay slurry or a mixture of such slurries. Slurries discharged from various wet processing steps may be blended. For example, the dispersed slurries can be one or sized fractions discharged from particle size fractionation equipment such as centrifuges, beneficiated clay slurries from a flotation plant, product discharged from a magnetic separation device, any combination of slurries from operations, such as, for example, a mixture of magnetically purified and nonpurified kaolin. The pH of these dispersed slurries may be neutral to mildly alkaline, e.g., 7 to 9, or neutral to mildly acidic, e.g., 5 to 7. These streams are well dispersed, i.e. they contain an amount of dispersant which suffices to form a clay-water system of minimum apparent viscosity. Reductive bleaching, which is generally the last wet processing step before filtration, is generally carried out at more highly acidic conditions, for example, at a pH of about 3. The phosphates of the present invention can still act as dispersants even under such acidic conditions.

In practicing this invention a dispersant grade of a water soluble alkali metal inorganic condensed phosphate salt is employed as a dispersant which is added prior to the ozonation step. As discussed above, condensed phosphates are phosphorus compounds with two or more phosphorus atoms in the molecule, including polyphosphates and pyrophosphates (which are actually a type of polyphosphate). The phosphates should also be alkali metal salts, such as sodium salts, rather than the double valent alkaline earth metal salts. Inorganic phosphates are used, because organic moieties can interfere with some of the clay processing steps. A preferred condensed phosphate salt is sodium hexametaphosphate (SHMP), commonly identified and sold under the name CALGON®. Other suitable condensed phosphate salts include sodium tripolyphosphate (STPP) and tetrasodium pyrophosphate (TSPP), although these phosphates are sometimes more difficult to dissolve into the slurries than SHMP. The phosphate dispersant can be introduced before, simultaneously with or immediately after sodium hypochlorite is added. As discussed above, the hypochlorite is added immediately before ozonation, preferably within one minute, more preferably within ten seconds, before the slurry enters the ozonation process. Prolonged aging of a slurry containing the hypochlorite may cause the hypochlorite to lose its effectiveness. Since a principal function of the dispersant is to improve the response of the clay to bleaching by ozone, it must be added before introduction of at least a major amount of the ozone, preferably before all ozone is introduced. Phosphates, such as sodium hexametaphosphate, may be incorporated into the slurry dry or as an aqueous solution. The phosphate may be incorporated simultaneously with addition of a solution of sodium hypochlorite by means of an in-line mixer at ambient temperature in direct connection to the reaction chamber of the ozonation equipment.

The amount of phosphate dispersant added is generally in the range of 0.25 to 5 pounds per ton (#/ton), preferably at least about 1 #/ton for improved dispersion, and preferably less than 3 #/ton for economy and to avoid excessive dispersion. Good results are obtained using between about 1 and 2 #/ton. (As used herein, all quantities of materials are expressed on a dry weight basis and clay weight is expressed as short tons.) When insufficient phosphate dispersant is employed, the beneficial effects may be negligible. An excess may result in excessive flocculation which could be detrimental to the effectiveness of the ozone bleach as well as subsequent magnetic purification.

The condensed phosphates of the present invention, when in pure form, will generally effect a modest decrease in the pH of the slurry. For example, in a simple laboratory test, the addition of sodium hexametaphosphate to a sample clay slurry with an initial pH of 8.1 reduced the pH to 7.8 when added at 0.5 #/ton, 7.8 at 1.0 #/ton, and 7.6 at 1.5 #/ton. It should be noted that some commercially available phosphate dispersants are actually mixtures of phosphates with highly basic materials such as soda ash or sodium hydroxide, which would obviously alter the pH effects.

Sodium hypochlorite is preferably introduced as a dilute aqueous solution, for example a solution of 8 to 15% weight concentration. From about 0.25 to 10 #/ton of clay may be used, preferably at least about 0.5 #/ton is used for improved bleaching, and preferably less than about 3 #/ton for economy and to avoid the presence of excess hypochlorite. It is desirable to minimize the quantity of sodium hypochlorite added because if excessive sodium hypochlorite is used some may survive the ozonation step and potentially cause corrosion in downstream processing equipment. Additionally, excessive residual sodium ions can have a detrimental effect on final product viscosity. Also, by minimizing the amount of residual sodium hypochlorite, subsequent reductive bleaching can occur more quickly with reduced addition of reductive bleach and acid and/or alum.

Sodium hypochlorite should be added within an hour of the time ozone is added, preferably within one minute of ozonation, and more preferably by injection into the feed stream by in-line mixing within seconds, e.g., 5 seconds, of ozonation. However, it is important that there is sufficient time and agitation for the hypochlorite to be fully mixed into the slurry prior to ozonation. If desired, the phosphate can be injected simultaneously with the hypochlorite. Prolonged aging of the slurry containing hypochlorite prior to introduction of ozone is to be avoided because the synergistic effect of the hypochlorite is reduced or eliminated as the sodium hypochlorite is consumed in its normal oxidative role. Sodium hypochlorite will normally increase pH by 0.1 to 0.5 pH units. Dispersion will not normally be affected significantly.

Ozone generators useful in the practice of the invention are well known in the kaolin industry. Conventional or specialized ozone generation can be used to introduce ozone into a dispersed slurry of pretreated kaolin. Generally, from about 0.1 to about 5 pounds of ozone per ton of clay (#/ton) is use, preferably at least about 0.5 #/ton, or even at least about 0.8 #/ton for increase bleaching. For economy and to prevent damage to equipment, preferably the amount of ozone used is minimized to that needed for the bleaching operation, with good results obtained using less than about 3 #/ton, or even less than about 1.5 #/ton. Ambient temperature is suitable for the ozone treatment. As demonstrated in the accompanying illustrative examples, the presence of an inorganic condensed phosphate dispersant, in accordance with the present invention, aids in the effectiveness of ozone bleaching.

The fluid slurry which is ozonated in accordance with the present invention is also purified by removal of colored discrete paramagnetic impurities (principally iron-bearing titania), either before or after ozonation. Conventional operation of high gradient magnetic separation units (HGMS) is described in U.S. Pat. No. 4,781,298, Hemstock, et al. These separators are also known as HIMS units (high intensity magnetic separators). An improved method for operating HGMS units is the subject of the +298 patent. Conventional or improved HGMS separators can be employed for the magnetic separation step. Cryogenic separators can also be used. The presence of added phosphate dispersant in the slurry fed to the magnetic separator facilitates removal of paramagnetic colored bodies in the separator, thereby further increasing the brightness of the clay. Thus, when the separation step is after ozonation, the added phosphate dispersant has a benefit in downstream magnetic processing as well as during ozonation.

The dispersed magnetically purified slurry is then preferably flocculated and bleached with a hydrosulfite reductive bleach, usually sodium hydrosulfite. The in situ bleach procedure of U.S. Pat. No. 5,112,782, Willis, et al. can be employed. The reductive bleach usually will further increase brightness. Even if brightness is not increased significantly, shade will be improved (yellowness is decreased). Reductive bleaching can be carried out before magnetic purification if desired, although additional steps to adjust pH may be required.

The invention may be more fully understood from the following illustrative examples.

The method of the invention was tested in a pilot plant facility utilizing clay-water suspensions (slurries) of gray kaolins currently being mined from selected gray clay horizons of the Dixie kaolin mine, located in Wilkinson County, Georgia, and wet processed in Engelhard Corporation's commercial facilities. This wet-processing entailed blunging the crude kaolin with water and dispersant, degritting the slurry of sand and other oversized material with drag boxes and screens, and the separation of the slurries into one or more particle size fractions by continuous centrifuges. In each of the examples the gray kaolin slurry subjected to the treatments described therein was a batch withdrawn from a particular production-line process stream which is a blend of gray kaolin slurries. The experiments described in the examples were conducted over a period of several months, so the slurry batch withdrawals were not of identical physical parameters, but were substantially similar, and within the limits of variations typical of production line process streams, which are controlled by statistical process quality controls to maintain the consistency of physical parameters. This gray kaolin slurry contained gray kaolin, water and about 0.2 to 0.6 weight percent dispersant, a mixture of soda ash, sodium hydroxide, sodium silicate and polyacrylate dispersants and was well dispersed. The GE brightness (prior to the processing described in the examples) was about 79–81.

In the examples, magnetic separation was conducted with a commercial high intensity magnetic separator (SILICONEL™ Model 805). Ozonation was conducted in a pilot scale Welsbaum ozonation unit which is essentially a closed stirred five gallon container. Ozone was bubbled into gray kaolin slurry contained in the ozonator column at a rate of 2.0 liters per minute, at a pressure of 8 pounds per square inch. The sodium hexametaphosphate (SHMP) used was obtained commercially as a solid, and used as a 20%, by weight, solids solution. Comparative examples were performed using sodium silicate solution which was N® Brand from Power Silicates which contains approximately 34% solids and has a $Na_2O/SiO_2$ molar ratio of about 1:3.2. The sodium hypochlorite was a commercially available solution of about 10% concentration. Reductive bleach was K-BRITE® dry sodium dithionite bleach from Virginia Chemical.

9

As is conventional in the industry, the addition levels of the solutions to the slurry are reported on a dry basis; that is, dry pounds of (100% active) chemical per dry short ton of clay. Initial mixing of the kaolin slurry with these solutions was carried out in a five gallon bucket, and was followed by 15 minutes of low shear mixing utilizing a drill press at 850 RPM. Brightness measurements were performed using the TAPPI standard method, T524, and were reported as "GE brightness" or "GEB values".

Example 1 of the Forbus 5,342,443 patent, previously incorporated by reference, demonstrates that a pretreatment of 1–4 pounds sodium hypochlorite per ton kaolin, admixed with the gray kaolin slurry for approximately 15 minutes prior to ozonation achieved unanticipated benefits in the brightness of the ozone-treated kaolin slurry. Brightness levels achieved by ozonation alone, without the benefit of the pretreatment, were achieved by pretreated samples at a significantly lower ozone treatment level. Example 2 of the Forbus patent demonstrates that a gray kaolin slurry that received the 1.0 or 2.0 pound sodium hypochlorite pretreatment 24 hours prior to ozonation achieved some brightness enhancements, as compared to conventional ozone processing, but the improvement was small compared to the results achieved in Example 1, wherein the pretreated slurry was immediately charged to the ozonators after mixing.

EXAMPLE 1

This example demonstrates the advantageous brightness enhancements obtained by the use of a combination of sodium hexametaphosphate and sodium hypochlorite in a pretreatment of gray kaolin slurry before ozone treatment and magnetic purification. The example demonstrates that the use of SHMP and sodium hypochlorite was at least as effective for bleaching clay as the use of sodium silicate and sodium hypochlorite, such as described in the Forbus patent.

For the following comparative study, twenty gallons of clay slurry were divided into four five-gallon samples. The slurry had an initial GE brightness (GEB) of 79.6, and a $TiO_2$ content of 2.123 percent by weight, an $Fe_2O_3$ content of 0.918 percent by weight, and a solids content of 34.5 percent by weight. All percentages in the following test results are expressed as percent by weight unless otherwise indicated. Each of the samples was prepared as follows:

Comparative Sample No. 1 was prepared by adding an amount of sodium silicate equivalent to 2 pounds per ton (#/ton) to a five-gallon sample. The slurry was immediately subjected to 15 minutes of low shear mixing with a drill press. Upon completion of this mixing, the slurry was charged to the ozonator and treated with ozone gas in the manner described above, at a rate equivalent to 2 #/ton. Slurry samples were withdrawn periodically to measure brightness, at various times during ozonation, as indicated in the results below by the amount of ozone added in #/ton. The sample was then magged at 40 TPH and bleached with 10 #/ton of K-Brite bleach. The GEB, and $TiO_2$ and $Fe_2O_3$ contents were then measured, and these results are also reported below.

Comparative Sample No. 2 was prepared in the same manner as Sample No. 1, but 1 #/ton of sodium hypochlorite was added with the silicate. This corresponds to the process set forth in Example 3, Batch V, of the Forbus 5,342,443 patent, discussed above.

Sample No. 3 was prepared in the same manner as Sample No. 2, but 2 #/ton of sodium hexametaphosphate (SHMP), in accordance with the present invention, was used in combination with 1 #/ton of sodium hypochlorite.

10

Sample No. 4 was prepared in the same manner as Sample No. 3, but 2 #/ton of sodium hypochlorite were used instead of 1 #/ton.

TABLE 1

Effect of SHMP on GEB Values of Ozonator Discharge

| Ozone Added #/ton | SAMPLES | | | |
|---|---|---|---|---|
| | No. 1 | No. 2 | No. 3 | No. 4 |
| | | GEB, % | | |
| 0.28 | 80.2 | 80.7 | | |
| 0.31 | | | | 80.7 |
| 0.57 | | 80.8 | | |
| 0.59 | 80.2 | | | |
| 0.67 | | | 80.7 | |
| 0.81 | | | | 80.7 |
| 1.18 | | | 80.8 | |
| 1.30 | | 80.8 | | |
| 1.53 | | | | 80.8 |
| 1.84 | | | 80.8 | |
| 1.91 | 80.3 | | | |
| 1.97 | | | | 80.8 |
| 2.09 | | | 81.0 | |
| 2.23 | | 81.0 | | |

After ozonation, the samples were purified by magging and reductive bleaching, as discussed above. The results are tabulated in Table 2.

TABLE 2

Effect of Pretreatment, Ozonation and Reductive Bleaching on GEB Values

| | Ozonation | GEB | | | $TiO_2$ | Fe |
|---|---|---|---|---|---|---|
| Sample No. | Ozone #/t | After Ozone | After Mag. | After Bleach | Final wt. % | Final wt. % |
| 1 | 1.9 | 80.3 | 84.2 | 84.8 | 1.648 | 0.891 |
| 2 | 2.2 | 81.0 | 84.4 | 85.1 | 1.295 | 0.851 |
| 3 | 2.1 | 81.0 | 84.7 | 85.3 | 1.400 | 0.867 |
| 4 | 2.0 | 80.8 | 83.9 | 85.0 | 1.645 | 0.860 |

A comparison of Samples 1 and 2 shows that the addition of sodium hypochlorite enhances the final GE brightness when sodium silicate is used in the pretreatment. A comparison of Samples 2 and 3 shows a further improvement when sodium hexametaphosphate is used in place of the sodium silicate. Sample 4 showed slightly poorer results, believed to be caused by using an excess of sodium hypochlorite, which may cause reflocculation of the clay.

EXAMPLE 2

This example was conducted in the same manner as Example 1, except sodium tripolyphosphate (STPP) was used as the condensed phosphate dispersant instead of sodium hexametaphosphate. The dry STPP was pulverized for better mixing before use. In this example, three five gallon samples were prepared from the same batch of gray kaolin slurry, with an initial GE brightness (GEB) of 79.6, a $TiO_2$ content of 2.188 percent by weight, an $Fe_2O_3$ content of 0.927 percent by weight, and a solids content of 34.5 percent by weight.

Comparative Sample No. 5 was prepared in the same manner as Comparative Sample No. 2 above, by adding 2 #/ton of sodium silicate and 1 #/ton of sodium hypochlorite to a five-gallons of slurry. The sample was mixed for 15 minutes, and then ozonated for 60 minutes, adding about 0.78 #/ton of ozone. After ozonation, the sample was magged at 40 TPH, and then reductive bleached with 10 #/ton of K-Brite® bleach.

Sample No. 6 was prepared in the same manner as Sample No. 5, except that 1 #/ton of STPP was used, in accordance with the present invention, in combination with 1 #/ton of sodium hypochlorite. The sample was ozonated for 60 minutes, adding about 0.72 #/ton of ozone, followed by magging and reductive bleaching as above.

Sample No. 7 was prepared in the same manner as Sample No. 6, except that 2 #/ton of STPP was used in combination with the 1 #/ton of sodium hypochlorite. The sample was ozonated for 60 minutes, adding about 0.60 #/ton of ozone, followed by magging and reductive bleaching as above.

GE brightness (GEB) was measured before and after ozonation, as well as after mag treatment and after reductive bleaching. $TiO_2$ and $Fe_2O_3$ were also measured before and after magging. The results are set forth in Table 3.

TABLE 3

Use of STPP as Phosphate Dispersant

| | GEB | | | | $TiO_2$ Wt. % | | $Fe_2O_3$ Wt. % | |
|---|---|---|---|---|---|---|---|---|
| Samp. No. | Pre Ozone | After Ozone | After Mag. | After Blch. | Pre Mag. | After Mag. | Pre Mag. | After Mag. |
| 5 | 80.1 | 82.1 | 84.3 | 85.7 | 2.10 | 1.75 | 0.93 | 0.84 |
| 6 | 80.5 | 81.6 | 83.9 | 85.5 | 2.09 | 1.82 | 0.93 | 0.89 |
| 7 | 80.7 | 82.0 | 84.5 | 85.6 | 2.10 | 1.67 | 0.94 | 0.87 |

The above data show that the use of STPP is at least comparable to the use of sodium silicate for improving the brightness of kaolin clays.

EXAMPLE 3

This example was conducted in the same manner as Example 2, except tetrasodium pyrophosphate (TSPP) was used as the condensed phosphate dispersant instead of STPP. The dry TSPP was pulverized for better mixing before use. As in Example 2, three five gallon samples were prepared from the same batch of gray kaolin slurry, with an initial GE brightness (GEB) of 79.5, a $TiO_2$ content of 2.038 percent by weight, an $Fe_2O_3$ content of 0.929 percent by weight, and a solids content of 34.2 percent by weight.

Comparative Sample No. 8 was prepared in the same manner as Comparative Sample No. 5 above, by adding 2 #/ton of sodium silicate and 1 #/ton of sodium hypochlorite to a five-gallons of slurry. The sample was mixed for 15 minutes, and then ozonated for 60 minutes, adding about 1.2 #/ton of ozone. After ozonation, the sample was magged at 40 TPH, and then reductive bleached with 10 #/ton of K-Brite® bleach.

Sample No. 9 was prepared in the same manner as Sample No. 8, except that 1 #/ton of TSPP was used, in accordance with the present invention, in combination with 1 #/ton of sodium hypochlorite. The sample was ozonated for 60 minutes, adding about 0.5 #/ton of ozone, followed by magging and reductive bleaching as above.

Sample No. 10 was prepared in the same manner as Sample No. 9, except that 0.5 #/ton of TSPP was used in combination with the 1 #/ton of sodium hypochlorite. The sample was ozonated for 60 minutes, adding about 0.6 #/ton of ozone, followed by magging and reductive bleaching as above.

GE brightness (GEB) was measured before and after ozonation, as well as after mag treatment and after reductive bleaching. $TiO_2$ and $Fe_2O_3$ were also measured before and after magging. The results are set forth in Table 4.

TABLE 4

Use of TSPP as Phosphate Dispersant

| | GEB | | | | $TiO_2$ Wt. % | | $Fe_2O_3$ Wt. % | |
|---|---|---|---|---|---|---|---|---|
| Samp. No. | Pre Ozone | After Ozone | After Mag. | After Blch. | Pre Mag. | After Mag. | Pre Mag. | After Mag. |
| 8 | — | 82.5 | 85.1 | 86.9 | 2.03 | 1.60 | 0.87 | 0.85 |
| 9 | — | 82.4 | 84.7 | 86.1 | 2.09 | 1.69 | 0.91 | 0.87 |
| 10 | — | 82.6 | 83.7 | 85.2 | 2.09 | 1.91 | 0.91 | 0.88 |

The above data showed that the use of TSPP was slightly less effective than sodium silicate for improving the brightness of kaolin clays, but this may be because of problems in getting the TSPP into solution. As a result, during the testing, the samples appeared to be reflocculating, indicating that there was not enough TSPP in solution to maintain dispersal. Adjustment of the process for dissolving the TSPP should overcome this problem.

What is claimed is:

1. An improved method for bleaching gray kaolin clay in which the method includes the step of oxidatively bleaching the clay with ozone, the improvement which comprises: adding about 0.25 to about 5 pounds of inorganic condensed phosphate per ton of clay and about 0.25 to about 10 pounds of sodium hypochlorite per ton of clay to a dispersed aqueous slurry of the gray kaolin clay, and within an hour of adding said sodium hypochlorite incorporating a bleach-effective quantity of ozone into said slurry, and subsequently recovering bleached kaolin clay of increased brightness.

2. The method of claim 1 further comprising the step of magnetically purifying the slurry of gray kaolin clay.

3. The method of claim 2 wherein the step of magnetically purifying the slurry follows the step of oxidatively bleaching of the clay with ozone.

4. The method of claim 1 further comprising the step of reductively bleaching the clay with a reducing bleach.

5. The method of claim 2 further comprising the step of reductively bleaching the clay with a reducing bleach.

6. The method of claim 5 wherein the steps of oxidatively bleaching of the clay with ozone, magnetically purifying the slurry, and reductively bleaching the clay are performed in that order.

7. The method of claim 1 wherein the sodium hypochlorite is added to the slurry by an in-line mixer immediately before incorporating the ozone into the slurry.

8. The method of claim 7 wherein the inorganic condensed phosphate is added to the slurry simultaneously with the sodium hypochlorite.

9. The method of claim 1 wherein said inorganic condensed phosphate is added to said slurry in an amount such that the total quantity of dispersant in said slurry is in excess of that required to achieve minimum viscosity.

10. The method of claim 1 wherein said inorganic condensed phosphate is selected from the group consisting of sodium hexametaphosphate, sodium tripolyphosphate, tetrasodium pyrophosphate and combinations thereof.

11. The method of claim 10 wherein said inorganic condensed phosphate is sodium hexametaphosphate.

12. The method of claim 1 wherein the clay slurry entering the oxidative bleaching step has a pH greater than about 5.

13. The method of claim 12 wherein said pH of the clay slurry is in the range of about 5 to 7.

14. The method of claim 1 wherein the amount of sodium hypochlorite added is sufficient to result in bleached kaolin clay having a higher brightness than the recovered kaolin clay would have in the absence of adding said sodium hypochlorite using the same amount of ozone.

15. The method of claim 1 wherein the amount of ozone used in the oxidative bleaching step is in the range of about 0.1 to about 5 pounds per ton of clay.

* * * * *